US011188198B2

(12) United States Patent
Murakami et al.

(10) Patent No.: US 11,188,198 B2
(45) Date of Patent: Nov. 30, 2021

(54) SETTINGS INFORMATION DISPLAY SYSTEM, METHOD, AND PROGRAM FOR DISPLAYING SETTINGS INFORMATION REGARDING REMOTE RESOURCES

(71) Applicant: Marubeni IT Solutions Inc., Tokyo (JP)

(72) Inventors: Akihiko Murakami, Tokyo (JP); Yoshihiko Kuzume, Tokyo (JP); Takaaki Kumagai, Tokyo (JP)

(73) Assignee: MARUBENI IT SOLUTIONS INC., Tokyo (JP)

( * ) Notice: Subject to any disclaimer, the term of this patent is extended or adjusted under 35 U.S.C. 154(b) by 0 days.

(21) Appl. No.: 16/933,372

(22) Filed: Jul. 20, 2020

(65) Prior Publication Data
US 2021/0026503 A1 Jan. 28, 2021

(30) Foreign Application Priority Data

Jul. 22, 2019 (JP) .................. 2019-134469

(51) Int. Cl.
G06F 3/0482 (2013.01)
H04L 29/08 (2006.01)
G06F 3/0481 (2013.01)
(52) U.S. Cl.
CPC ........ G06F 3/0482 (2013.01); G06F 3/04817 (2013.01); H04L 67/1097 (2013.01)
(58) Field of Classification Search
None
See application file for complete search history.

(56) References Cited

U.S. PATENT DOCUMENTS

2014/0173272 A1  6/2014 Kim
2018/0322136 A1* 11/2018 Carpentier ............. G06F 9/452
2019/0332688 A1* 10/2019 Valentine .............. G06F 16/955

FOREIGN PATENT DOCUMENTS

JP  2012079043     4/2012
JP  2014-508970 A  4/2014
WO  2017126105    7/2017

OTHER PUBLICATIONS

Japan Patent Office, Japanese Office Action dated Oct. 20, 2020 in Application No. 2019-134469.

* cited by examiner

Primary Examiner — Tuan S Nguyen
(74) Attorney, Agent, or Firm — Snell & Wilmer L.L.P.

(57) ABSTRACT

An object of the present invention is to make confirmation of setting of a file folder on a cloud storage possible through more simple operation. A settings information display apparatus which displays settings information regarding a file folder stored in a cloud storage on a cloud network detects that the file folder in the cloud storage, which is displayed in a first display region of the settings information display apparatus, is selected, displays data stored in the selected file folder in a second display region of the settings information display apparatus and an icon, or the like, for displaying settings information regarding the selected file folder by being triggered by the detection, and displays the settings information regarding the selected file folder in a third display region of the settings information display apparatus by being triggered by the icon, or the like, being operated.

17 Claims, 8 Drawing Sheets

Fig. 6

All Files > shared document

Explanation of Folder
Contact SUZUKI when creating folder

| Name | Date of Update | Size | Share | Detail |
|---|---|---|---|---|
| | | | SUZUKI ICHIRO | |
| administration | JUNE 1, 2019, YAMADA TARO | 500 Files | YAMADA HANAKO Editor | |
| knowledge | MAY 30, 2019, SUZUKI ICHIRO | 354 Files | YAMADA TARO Editor | |

SETTINGS INFORMATION DISPLAY SYSTEM, METHOD, AND PROGRAM FOR DISPLAYING SETTINGS INFORMATION REGARDING REMOTE RESOURCES

CROSS REFERENCE TO RELATED APPLICATIONS

This application claims priority to Japanese Patent Application No. 134469/2019, which was filed on Jul. 22, 2019. This application is incorporated by reference in its entirety for all purposes.

TECHNICAL FIELD

The present invention relates to a method for displaying settings information regarding remote resources.

BACKGROUND ART

There has existed a cloud computing system in which a user can store data and read out and utilize data by accessing a cloud storage on a cloud network from a terminal such as a smartphone and a personal computer apparatus (for example, as set forth in Japanese Publication No. 2014-508970). In such a cloud storage, it is possible to set access authority, or the like, for a file folder in which files are stored. The cloud storage holds settings information such as access authority of each folder.

SUMMARY OF INVENTION

Technical Problem

Examples of a method conventionally employed to change settings information on each folder include a method in which settings information is changed by separately accessing and logging into a web page for changing settings information from a web browser to open a settings screen, and a method in which a user displays menu for displaying settings information at menu which is displayed when the user right-clicks on a folder and selects a function for displaying settings information. In a case of such conventional methods, a plurality of operation steps are required to change the settings information, and operation is cumbersome.

In particular, because confirmation of access authority is more important, and operation of confirmation and setting of access authority is frequently performed by the user, it is desired to easily confirm settings information on access authority of a folder with less operation.

The present invention has been made in view of such a problem.

Solution to Problem

To solve the above-described problem, one aspect of the present invention is a settings information display apparatus which displays settings information regarding a file folder stored in a cloud storage which is a storage region on a cloud network, the settings information display apparatus including a detecting unit configured to detect that the file folder in the cloud storage, which is displayed in a first display region of the settings information display apparatus, is selected, a disposing unit configured to display data stored in the selected file folder in a second display region of the settings information display apparatus and display an icon or a character string for displaying settings information regarding the selected file folder, or in a case where the data does not exist in the selected file folder, display an icon or a character string for displaying settings information regarding the selected file folder, by being triggered by detection by the detecting unit, and a settings information display unit configured to display the settings information regarding the selected file folder in a third display region of the settings information display apparatus by being triggered by the icon or the character string being operated by an input device.

Further, another aspect of the present invention is a method for displaying settings information regarding a file folder stored in a cloud storage which is a storage region on a cloud network, the method being a method to be executed by a computer apparatus, the method including detecting that the file folder in the cloud storage, which is displayed in a first display region of the computer apparatus, is selected, displaying data stored in the selected file folder in a second display region of the computer apparatus and displaying an icon or a character string for displaying settings information solely regarding the selected file folder, or in a case where the data does not exist in the selected file folder, displaying an icon or a character string for displaying settings information regarding the selected file folder, by being triggered by the detection, and displaying the settings information regarding the selected file folder in a third display region of the computer apparatus by being triggered by the icon or the character string being operated by an input device.

Further, still another aspect of the present invention is a program for causing a computer apparatus to execute the above-described method.

BRIEF DESCRIPTION OF DRAWINGS

FIG. 6 is a view illustrating a specific example of settings information to be held in a cloud storage of the settings information display system according to one embodiment of the present invention.

DESCRIPTION OF EMBODIMENTS

An embodiment of the present invention will be described below in detail with reference to the drawings.

(Configuration of Settings Information Display System)

Figure 1:
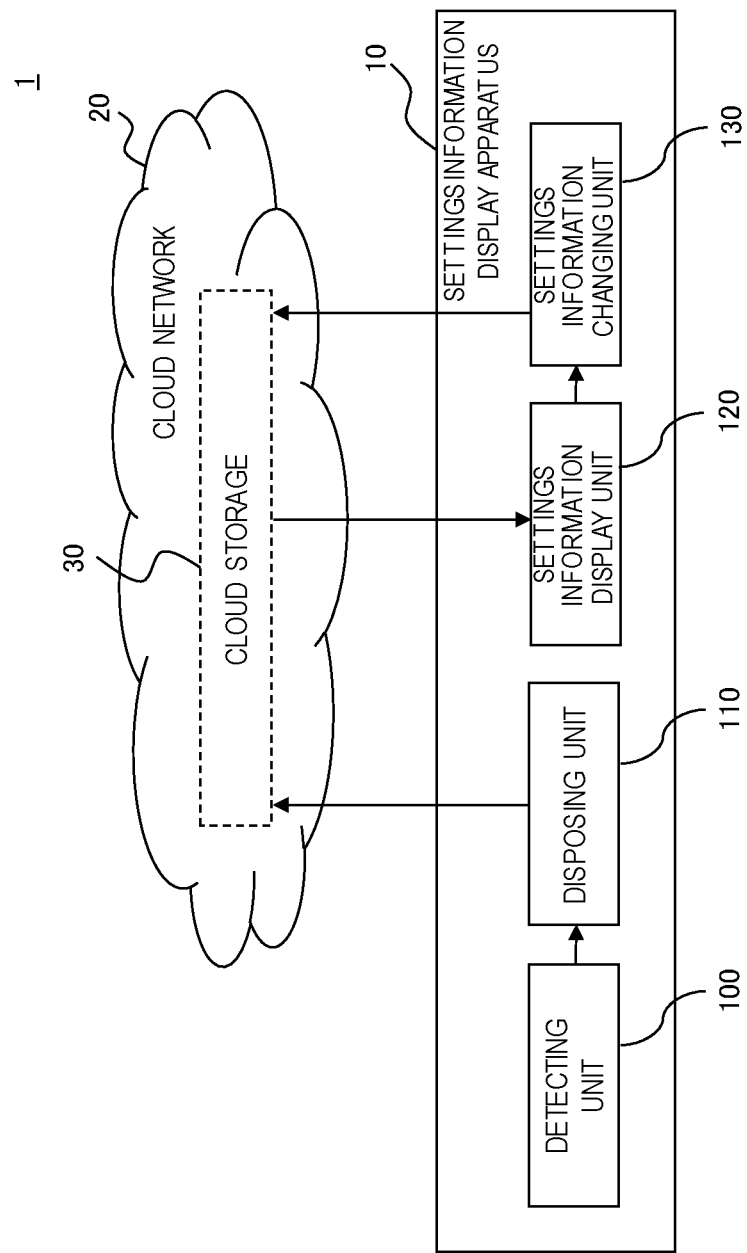
FIG. 1 is a view illustrating an example of a configuration of a settings information display system including a settings information display apparatus according to one embodiment of the present invention.

FIG. 1 is a view illustrating an example of a configuration of a settings information display system including a settings information display apparatus according to the present embodiment. In a settings information display system 1 illustrated in FIG. 1, a settings information display apparatus 10 is a computer apparatus which displays settings information regarding a file folder stored in a cloud storage 30 which is a storage region on a cloud network 20. The settings information display apparatus 10 may be able to access the cloud storage 30 via a network such as the Internet which is not illustrated. It is assumed that the settings information display apparatus 10 is a terminal apparatus which is operated by, for example, a user, or the like, who receives service from the cloud storage 30 and who creates at least one file folder for the user in the cloud storage 30 and stores at least one file. The settings information display apparatus 10 may be a computer apparatus such as a personal computer apparatus, a smartphone and a PDA (Personal Digital Assistant). Further, the "settings information" may be information, or the like, indicating setting such as access authority of the file folder, explanation of the file folder, an ID uniquely indicating the file folder, access history of the file folder, and whether or not there is a link to the file folder. The settings information display apparatus 10 includes a detecting unit 100, a disposing unit 110, a settings information display unit 120 and a settings information changing unit 130.

The detecting unit 100 detects that a file folder in the cloud storage 30, which is displayed in a first display region of the settings information display apparatus 10, is selected. The detecting unit 100, for example, detects that a user selects a file folder through operation for selecting the file folder, such as single click, double click, cursor movement using a keyboard, touch operation through a touch panel, and selection instruction through speech input, using an input device such as a mouse, the keyboard and the touch panel. The "first display region" can correspond to a window region, a panel screen, an application screen, a pop-up screen, or the like, in Windows (registered trademark) which is an operating system of Microsoft (registered trademark) Corporation, Mac OS (registered trademark) which is an operating system of Apple (registered trademark) Inc., UNIX (registered trademark) which is an operating system of an open group, or the like, (this will similarly apply to a "second display region" and a "third display region" which will be described later).

The disposing unit 110 displays data stored in the selected file folder in the second display region of the settings information display apparatus 10 and displays an icon or a character string for displaying settings information regarding the selected file folder (in a case where the data does not exist in the selected file folder, the latter may be solely executed), by being triggered by detection by the detecting unit 100. The "data stored in the selected file folder" may be specifically, for example, a file, a file folder or other various kinds of data subordinate to the selected file folder.

The settings information display unit 120 displays the settings information regarding the selected file folder in the third display region of the settings information display apparatus 10 by being triggered by the icon or the character string being operated by an input device. The "icon or the character string being operated by an input device" can include overall operation for indication, selection, or the like, of the icon or the character string (hereinafter, abbreviated as the "icon, or the like"), such as single click, double click, mouseover (hovering a mouse pointer on the icon, or the like), cursor movement using a keyboard, touch operation through a touch panel, and selection instruction through speech input, to be performed for the icon, or the like. That is, a user of the settings information display apparatus 10 performs such operation on the icon, or the like, by operating the input device for displaying the settings information on the file folder at the settings information display apparatus 10.

Further, the settings information display unit 120 may display settings information, for example, in a preview screen (third display region) of a window region (second display region) in which the icon, or the like, are displayed along with a file, a file folder, or the like, subordinate to the selected file folder, another window region (third display region) existing in the vicinity of the window region (second display region), or a region (third display region) such as a window region, a panel screen, an application screen or a pop-up screen newly generated within a screen which is the same as or different from the window region (second display region). Part or all of the above-described first display region, second display region and third display region may be a window region. Further, the third display region may be a preview region of the first display region or the second display region. Further, in a case where there are a plurality of displays of the settings information display apparatus 10 (for example, in a case of multi-display), or in a case where the settings information display apparatus 10 is constituted with a plurality of computer apparatuses, part or all of the first display region, the second display region and the third display region may be displayed at different displays or may be displayed at the same display. Still further, in the latter case, part or all of the first display region, the second display region and the third display region may be the same region.

Further, because settings information regarding a file folder is normally held by the cloud storage 30, the settings information display unit 120 acquires settings information on the selected file folder from the cloud storage 30 and displays the settings information. Further, for example, in a case where the settings information which has been acquired once is stored in a storage region such as a cache in the settings information display apparatus 10, the settings information does not necessarily have to be acquired from the cloud storage 30.

In a case where change processing is performed on the settings information displayed by the settings information display unit 120, the settings information changing unit 130 transmits the settings information subjected to the change processing to the cloud storage. For example, in a case where the user changes access authority of the file folder displayed in a preview region, or the like, (third display region) by operating an input device such as a keyboard and a mouse, the change content may be transmitted from the settings information display apparatus 10 to the cloud storage 30 via a network such as the Internet, and the change content may be stored in the cloud storage 30.

Note that the configuration of the settings information display system 1 and the settings information display apparatus 10 illustrated in FIG. 1 is merely an example, and is not limited to this.

(Hardware Configuration)

Figure 2:
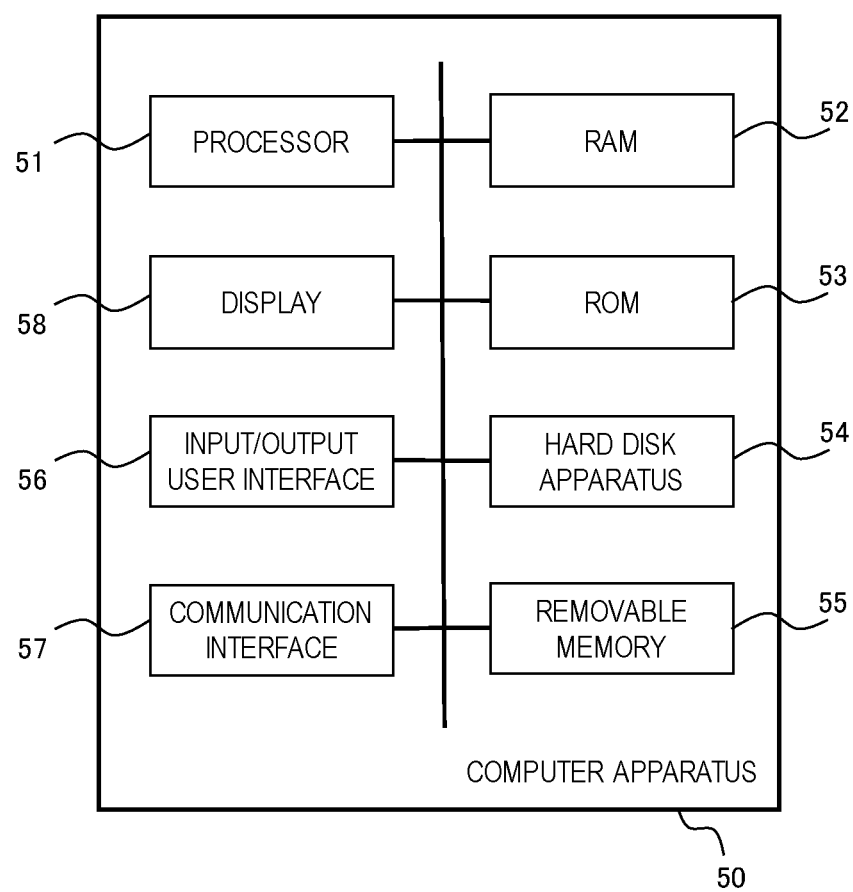
FIG. 2 is a view illustrating an example of a hardware configuration of the settings information display apparatus according to one embodiment of the present invention.

The configuration of the settings information display apparatus 10 of the settings information display system 1 described above can be realized with a hardware configuration which is similar to that of a typical computer apparatus. FIG. 2 is a view illustrating an example of a hardware configuration of the settings information display apparatus 10. As an example, the computer apparatus 50 illustrated in FIG. 2 includes a processor 51, a random access memory (RAM) 52, a read only memory (ROM) 53, a built-in hard disk apparatus 54, a removable memory 55 such as an external hard disk apparatus, a CD, a DVD, a USB memory, a memory stick and an SD card, an input/output user interface 56 (such as a keyboard, a mouse, a touch panel, a speaker, a microphone and a lamp) to be used by the user to exchange data with the computer apparatus 50, a wired/wireless communication interface 57 which allows communication with other computer apparatuses, and a display 58. Functions of the settings information display apparatus 10 according to the present embodiment can be realized by, for example, the processor 51 reading out a program stored in advance in the hard disk apparatus 54, the ROM 53, the removable memory 55, or the like, to a memory such as the RAM 52 and executing the program while reading out the above-described data required for processing from the hard disk apparatus 54, the ROM 53, the removable memory 55, or the like, as appropriate.

Further, the display 58 may be a multi-display. Still further, the settings information display apparatus 10 may be constituted as a single computer apparatus or may be constituted with a plurality of computer apparatuses. In the latter case, the respective computer apparatuses may have configurations which are the same as or similar to the configuration of the computer apparatus 50 illustrated in FIG. 2.

Note that the hardware configuration illustrated in FIG. 2 is merely an example, and is not limited to this.

Specific Example

A specific example of the settings information display apparatus 10 according to the present embodiment will be described below with reference to FIG. 3 to FIG. 6.

Figure 3:
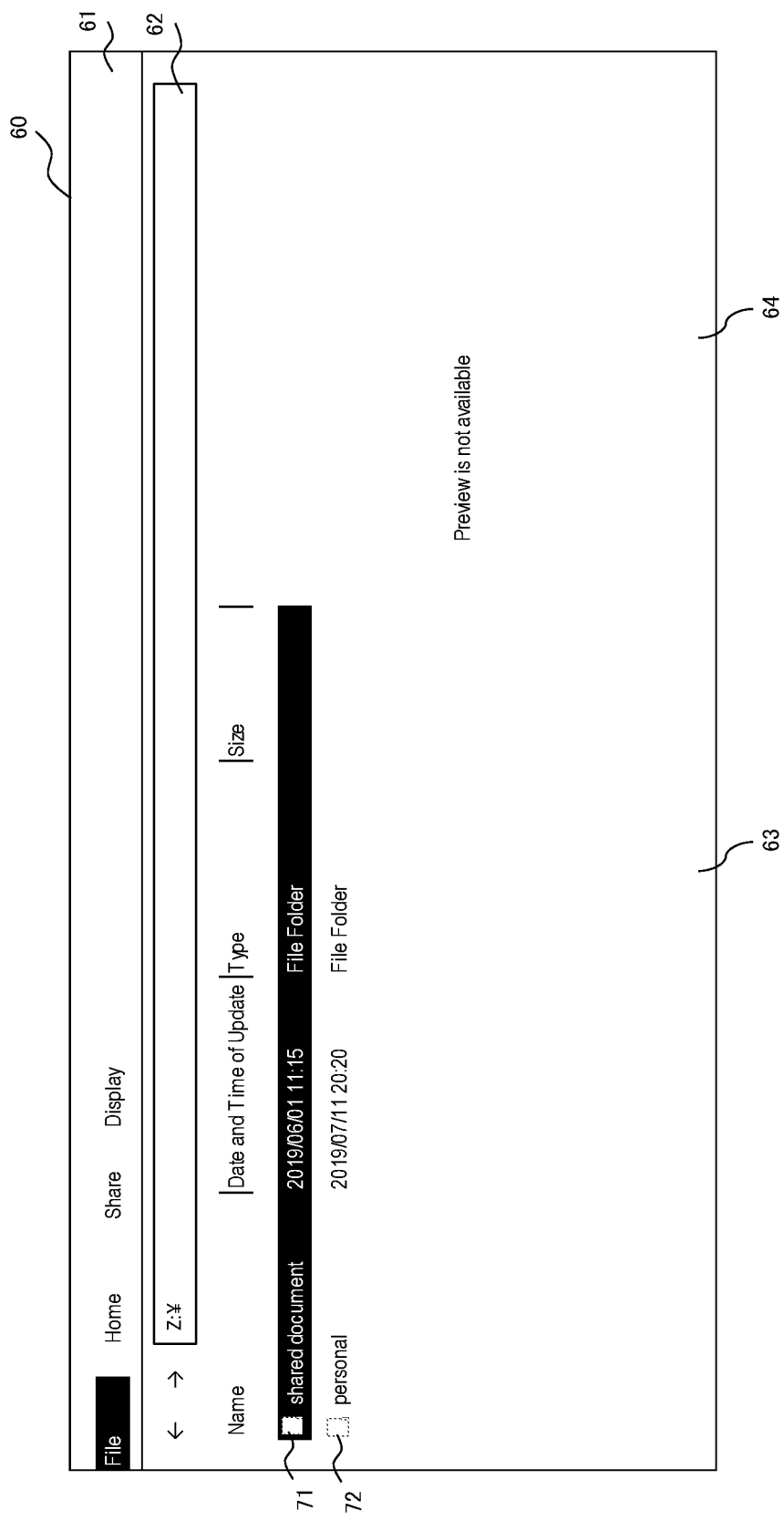
FIG. 3 is a view illustrating a specific example of the settings information display apparatus according to one embodiment of the present invention.
Figure 4:
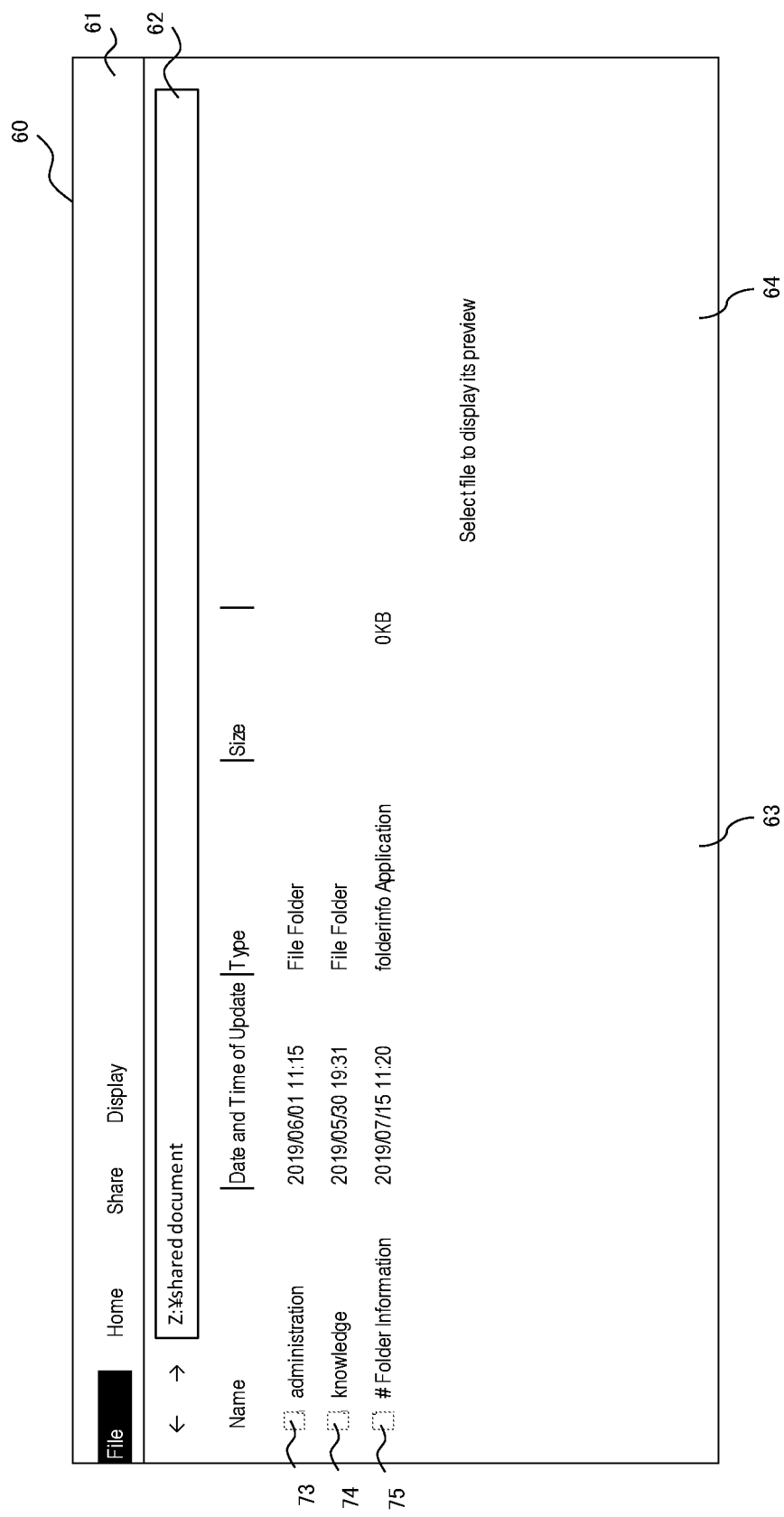
FIG. 4 is a view illustrating a specific example of the settings information display apparatus according to one embodiment of the present invention.

FIG. 3 is an example of a display screen to be displayed at a display, or the like, of the settings information display apparatus 10. For example, a window region 60 of File Explorer in Windows (registered trademark) of Microsoft (registered trademark) Corporation, or the like, can include a menu region 61, a region 62 for displaying path information on a file or a file folder, a region 63 for displaying a file or a file folder, a preview region 64 for displaying information on the file or the file folder selected in the region 63, and the like. FIG. 3 illustrates a state where a "shared document" folder 71 and a "personal" folder 72 exist subordinately to a Z drive (Z:¥). Here, if the user of the settings information display apparatus 10 selects the "shared document" folder 71 through double click, or the like, by operating an input device such as a mouse, a keyboard, or a touch panel, an "administration" folder 73 and a "knowledge" folder 74 existing within the "shared document" folder 71 are displayed as illustrated in FIG. 4. Further, at this time, an icon 75 for displaying access authority (settings information) of the "shared document" folder 71 which is a parent file folder as a higher-order layer, within a region 63 which is the same region as that for these file folders, is displayed. In FIG. 4, as an example of the icon or the character string, the icon 75 in a file format (dummy file) is displayed.

Figure 5:
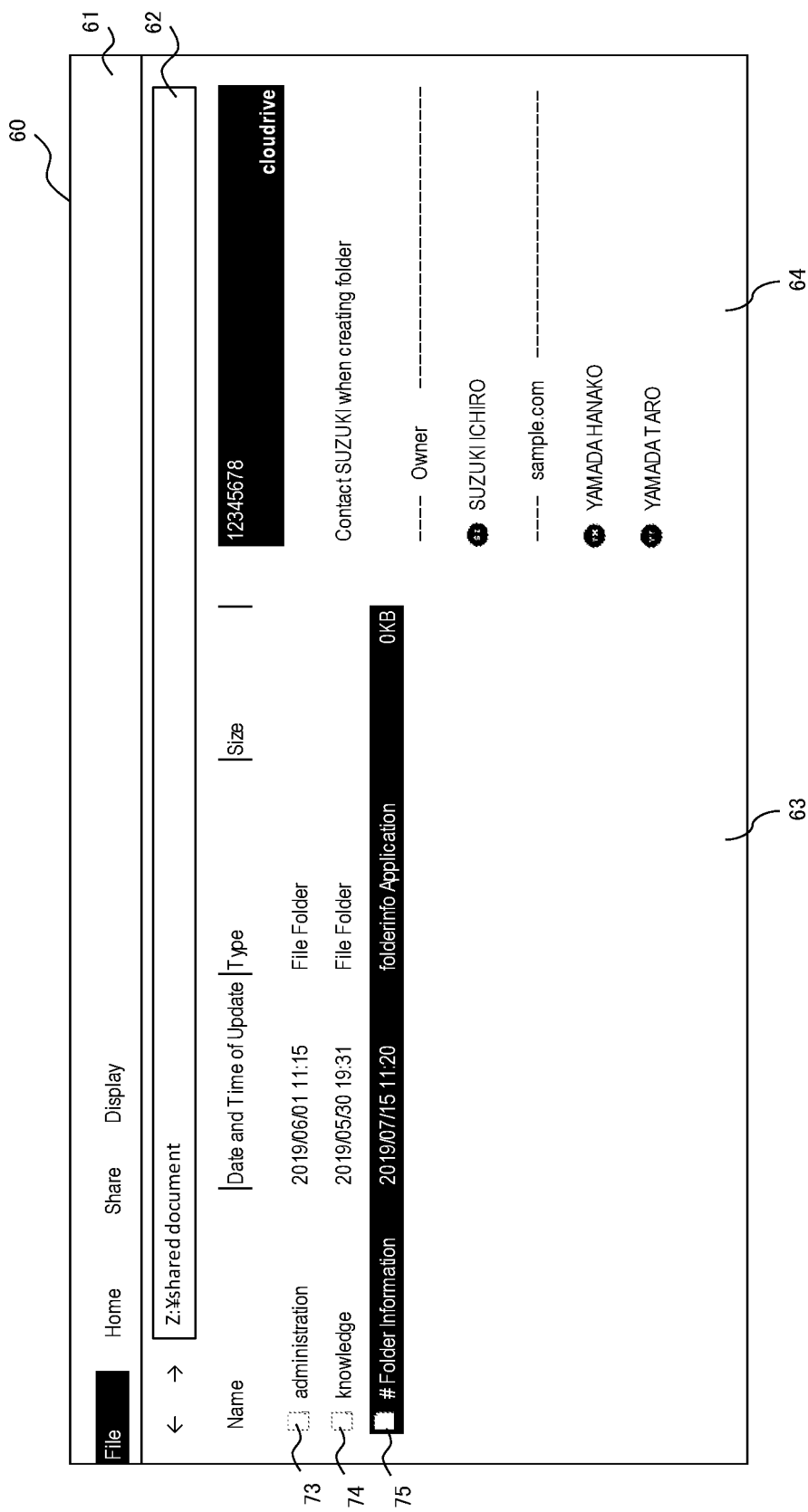
FIG. 5 is a view illustrating a specific example of the settings information display apparatus according to one embodiment of the present invention.

Then, when the icon 75 of a dummy file is selected through operation such as double click, information such as access authority of the "shared document" folder is displayed in a preview region 64 of the region 63 as illustrated in FIG. 5. While, in the example in FIG. 5, a user having access authority is displayed, for example, operation authority such as authority which allows only browsing, authority which allows editing, and authority which allows deletion may be set for each user.

Settings information such as access authority of the file folder as illustrated in FIG. 5 can be held by the cloud storage 30. FIG. 6 illustrates an example of settings information for each file folder held by the cloud storage 30.

In the example in FIG. 6, as the settings information, information such as explanation of a folder to be displayed in the preview screen when the "shared document" folder 71 is selected, information indicating that the "administration" folder 73 and the "knowledge" folder 74 exist under the "shared document" folder 71, date of update of these subordinate folders, a person who has performed updating, and sizes, and information such as shared information (users who have access authority), are set. The cloud storage 30 can store such settings information in a storage apparatus such as a hard disk for each file folder. Then, when the user clicks the dummy file 75 displayed in the settings information display apparatus 10 as illustrated in FIG. 5, the settings information display apparatus 10 requests settings information on a file folder (in the present example, the "shared document" folder) associated with the dummy file 75 to the cloud storage 30 via a wired or wireless communication network. The cloud storage 30 transmits the settings information on the file folder held by the cloud storage 30 to the settings information display apparatus 10 via a communication network. The settings information display apparatus 10 outputs the received settings information on the file folder through display at a display, or the like. Thereafter, the user performs processing, or the like, of changing the displayed settings information on the file folder, as necessary, while confirming the settings information.

(Processing Sequence)

Figure 7:
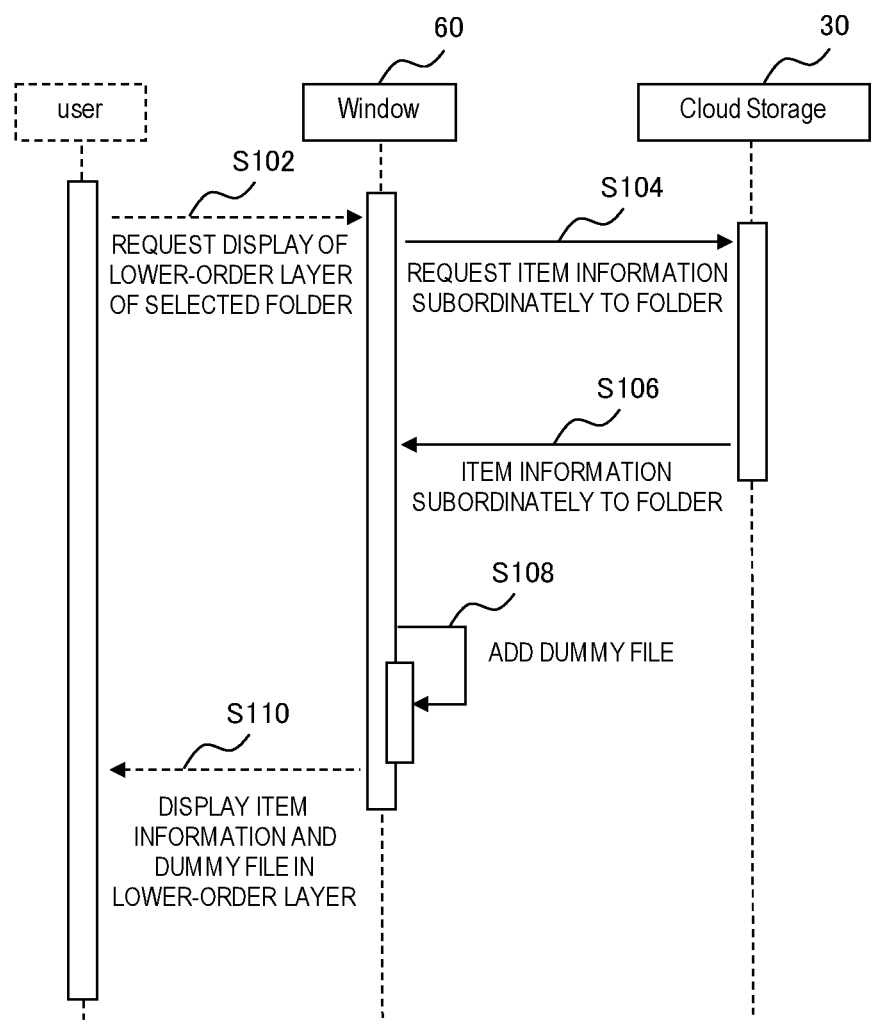
FIG. 7 is a sequence diagram illustrating an example of processing in the settings information display system according to one embodiment of the present invention.
Figure 8:
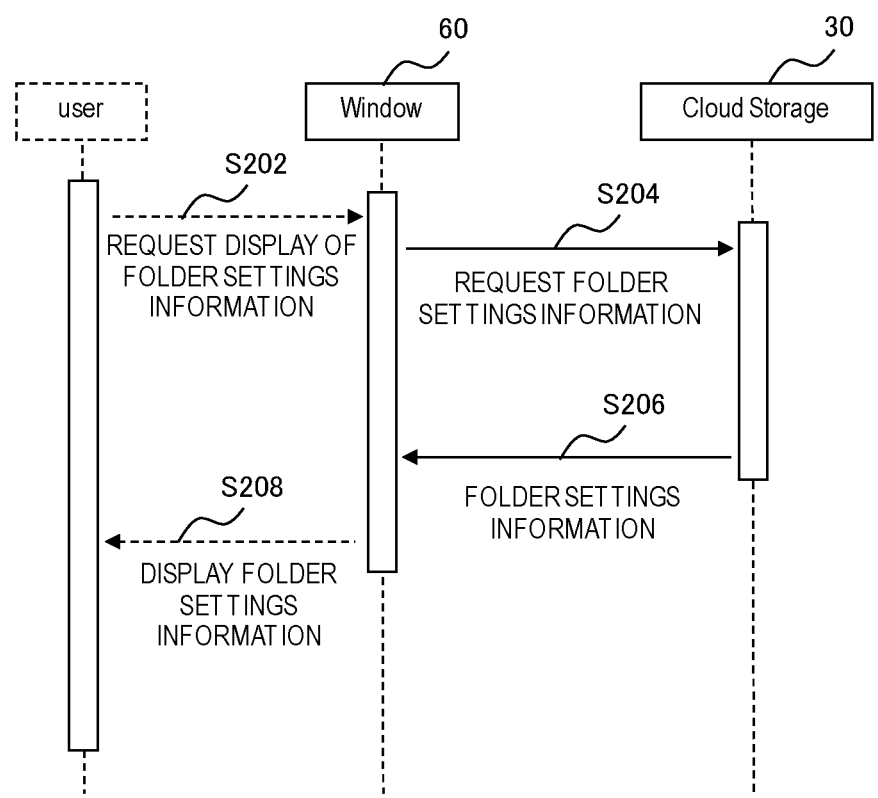
FIG. 8 is a sequence diagram illustrating an example of processing in the settings information display system according to one embodiment of the present invention.

FIG. 7 and FIG. 8 are sequence diagrams illustrating an example of processing in the settings information display system according to the present embodiment. Hereinafter, in description of FIG. 7 and FIG. 8, the description will be provided along specific examples in FIG. 3 to FIG. 5.

FIG. 7 is a sequence diagram illustrating an example in a case where the settings information display apparatus 10 displays an icon, or the like, (a dummy file) along with subordinate files or file folders of a specific file folder, in a case where the specific file folder is selected. FIG. 7 mainly illustrates processing in a case where the screen transitions from the screen in FIG. 3 to the screen in FIG. 4.

If the "shared document" folder 71 displayed within the window region 60 is selected through click operation, or the like, of a mouse by the user (step S102), the window region 60 (detecting unit 100) detects that the "shared document" folder 71 is selected, and the disposing unit 110 requests item information existing subordinately to the "shared document" folder 71 to the cloud storage 30 (step S104). Here, the "item information" can correspond to files, file folders, and other various kinds of data which exist subordinately to the "shared document" folder 71.

The cloud storage 30 acquires information indicating that the "administration" folder 73 and the "knowledge" folder 74 exist with reference to the settings information regarding the "shared document" folder 71 among the settings information on respective file folders held by the cloud storage 30. Then, the cloud storage 30 transmits the acquired information to the window region 60 (settings information display apparatus 10) (step S106). The window region 60 adds data of a dummy file associated with the "shared document" folder 71 to the information received from the cloud storage 30. (That is, in a case of the present example, the settings information display apparatus 10 holds the file data of the dummy file in a storage region such as a hard disk. Further, the settings information display apparatus 10 may have information as to whether or not to display the dummy file.) More specifically, for example, an extension of the dummy file may be associated with processing of, if the dummy file is selected through click, or the like, accessing the cloud storage 30 to acquire the settings information on the "shared document" folder 71 and displaying the settings information at a display of the settings information display apparatus 10 (step S108). The window region 60 displays the "administration" folder 73, the "knowledge" folder 74 and the dummy file 75 existing subordinately to (lower-order layer of) the "shared document" folder 71 selected by the user in step S102 (step S110).

Note that the above-described step 104 can be mainly executed by the detecting unit 100 and the disposing unit 110. Further, steps S106, S108 and S110 can be mainly executed by the disposing unit 110.

FIG. 8 is a sequence diagram illustrating an example of processing to be executed in a case where the dummy file is operated. FIG. 8 mainly illustrates processing corresponding to FIG. 5.

If the dummy file 75 displayed within the window region 60 is selected through input device operation, or the like, by the user (step S202), the window region 60 detects that the dummy file 75 is selected and requests settings information on the "shared document" folder 71 to the cloud storage 30 (step S204).

The cloud storage 30 acquires settings information such as access authority with reference to the settings information regarding the "shared document" folder 71 among the settings information (FIG. 6) on the respective file folders held by the cloud storage 30. Then, the cloud storage 30 transmits the acquired settings information to the window region 60 (settings information display apparatus 10) (step S206). The window region 60 displays the settings information received from the cloud storage 30 in the preview region (step S208).

The above-described steps S204, S206 and S208 can be mainly executed by the settings information display unit 120.

Further, while, in the above-described embodiment, a case has been assumed where the data of the dummy file is held in the settings information display apparatus 10 (see step S108, or the like), the data of the dummy file may be held in a storage region such as a hard disk of the cloud storage 30. In this case, for example, if the "shared document" folder 71 is selected through click operation, or the like, in step S102, it is also possible to make an inquiry at the same time in step S104 as to whether a dummy file for displaying settings information along with item information existing subordinately to the "shared document" folder 71 exists. Then, in step S106, the cloud storage 30 may transmit information indicating that the "administration" folder 73 and the "knowledge" folder 74 under the "shared document" folder 71 exist, and the data of the dummy file to the window region 60 (settings information display apparatus 10). Thereafter, the dummy file 75 may be displayed along with the "administration" folder 73 and the "knowledge" folder 74 in the window region 60 (settings information display apparatus 10) (step S110). Further, in this case, while the settings information on the "shared document" folder 71 may be requested to the cloud storage 30 when the dummy file 75 is selected as in step S204 described above, for example, the settings information on the "shared document" folder 71 associated with the dummy file may be acquired from the cloud storage 30 at the same time when the dummy file is requested in step S104. Further, the data of the dummy file or the settings information on the "shared document" folder 71 may be cached as appropriate, in which case, the settings information on the dummy file 75 or the "shared document" folder 71 may be read out from a cache of the settings information display apparatus 10.

The present embodiment has been described above as the method to be executed by the settings information display system (settings information display apparatus) and the settings information display system (settings information display apparatus). However, it should be understood that if the present disclosure can be implemented as a program for causing the processor to execute the method if the program is executed by a processor, or as a computer-readable storage medium on which the program is stored.

According to the settings information display system (settings information display apparatus) according to the present embodiment described above, the user can confirm and change settings information such as access authority of a file folder only through simple operation such as selection of an icon or a character string displayed under the file folder.

While one embodiment of the present invention has been described above, it goes without saying that the present invention is not limited to the above-described embodiment and can be implemented in various different forms within the scope of its technical idea.

Further, the scope of the present invention is not limited to the illustrated and described illustrative embodiment, and includes all embodiments which provide effects equivalent to those to be provided from the present invention. Still further, the scope of the present invention is not limited to combination of features of the inventions defined in respective claims, and can be defined by any desired combination of specific features among all the disclosed respective features.

REFERENCE SIGNS LIST

1 settings information display system
10 settings information display apparatus
20 cloud network
30 cloud storage
100 detecting unit
110 disposing unit
120 settings information display unit
130 settings information changing unit
50 computer apparatus
51 processor
52 RAM
53 ROM
54 hard disk apparatus
55 removable memory
56 input/output user interface
57 communication interface
58 display
60 window region
61 menu region
62 display region of path information on file and file folder
63 display region of file and file folder
64 preview region
71 to 74 file folder
75 icon

What is claimed is:
1. A method comprising:
acquiring, by a processor, a file folder from cloud storage;
displaying, by the processor and in a first display region, the file folder;

acquiring, by the processor and from the cloud storage, information indicating data stored in the file folder, in response to user selection of the file folder by a user, wherein the data is acquired from the cloud storage, wherein the data refers to settings information about the file folder;

adding, by the processor, at least one of an icon or a character string associated with the file folder to the information indicating data stored in the file folder acquired from the cloud storage;

displaying, by the processor and in a second display region, the data stored in the file folder and the at least one of the icon or the character string associated with the file folder;

acquiring, by the processor, settings information about the file folder from the cloud storage, in response to user selection of the at least one of the icon or the character string, wherein the settings information is associated with a settings file in the cloud storage;

displaying, by the processor and in a third display region, the settings information;

receiving, by the processor, changes to the settings information from the user, wherein the settings information includes operation authority comprising at least one of browsing authority, editing authority or deletion authority;

storing, by the processor, the settings information in cache on a client side; and updating, by the processor, the cloud storage based on the changes to the settings information.

2. The method of claim 1, wherein the displaying the data in the file folder and the acquiring the at least one of the icon or the character string are both in response to the same user selection of the file folder.

3. The method of claim 1, wherein the displaying the at least one of the icon or the character string comprises displaying the settings file.

4. The method of claim 1, further comprising displaying, by the processor, only the at least one of the icon or the character string in the second display region, in response to data not being associated with the file folder.

5. The method of claim 1, further comprising creating the file folder for the user in the cloud storage.

6. The method of claim 1, further comprising saving the file folder in the cloud storage.

7. The method of claim 1, further comprising detecting the file folder in the cloud storage, in response to the user selection of the file folder.

8. The method of claim 1, wherein the settings information includes at least one of access authority for the file folder, operation authority, an explanation for the file folder, an identifier indicating a file folder, access history of the file folder or a link to the file folder.

9. The method of claim 1, wherein the settings information includes at least one of an explanation of a sub-file folder, association between the sub-file folder and the file folder, a person that updated the sub-file folder, a size of the sub-file folder or access information.

10. The method of claim 1, wherein the file folder includes a plurality of file folders.

11. The method of claim 1, wherein the file folder is at least one of a personal folder or a shared document folder.

12. The method of claim 1, wherein the third display region is a preview region of at least one of the first display region or the second display region.

13. The method of claim 1, wherein at least a portion of the first display region, the second display region and the third display region is a window region.

14. The method of claim 1, wherein at least a portion of the first display region, the second display region and the third display region is a same region.

15. The method of claim 1, further comprising:
acquiring, by the processor, a sub-file folder from the cloud storage, in response to the user selection of the file folder, wherein the file folder is a higher order layer of the sub-file folder;
displaying, by the processor and in the second display region, the sub-file folder.

16. An article of manufacture including a non-transitory, tangible computer readable storage medium having instructions stored thereon that, in response to execution by a processor, cause the processor to perform operations comprising:
acquiring, by the processor, a file folder from cloud storage;
displaying, by the processor and in a first display region, the file folder;
acquiring, by the processor and from the cloud storage, information indicating data stored in the file folder, in response to user selection of the file folder by a user, wherein the data is acquired from the cloud storage, wherein the data refers to settings information about the file folder;
adding, by the processor, at least one of an icon or a character string associated with the file folder to the information indicating data stored in the file folder acquired from the cloud storage;
displaying, by the processor and in a second display region, the data stored in the file folder and the at least one of the icon or the character string associated with the file folder;
acquiring, by the processor, settings information about the file folder from the cloud storage, in response to user selection of the at least one of the icon or the character string, wherein the settings information is associated with a settings file in the cloud storage;
displaying, by the processor and in a third display region, the settings information;
receiving, by the processor, changes to the settings information from the user, wherein the settings information includes operation authority comprising at least one of browsing authority, editing authority or deletion authority;
storing, by the processor, the settings information in cache on a client side; and
updating, by the processor, the cloud storage based on the changes to the settings information.

17. A system comprising:
a processor; and
a tangible, non-transitory memory configured to communicate with the processor,
the tangible, non-transitory memory having instructions stored thereon that, in response to execution by the processor, cause the processor to perform operations comprising:
acquiring, by the processor, a file folder from cloud storage;
displaying, by the processor and in a first display region, the file folder;
acquiring, by the processor and from the cloud storage, information indicating data stored in the file folder, in response to user selection of the file folder by a user, wherein the data is acquired from the cloud storage, wherein the data refers to settings information about the file folder;

adding, by the processor, at least one of an icon or a character string associated with the file folder to the information indicating data stored in the file folder acquired from the cloud storage;

displaying, by the processor and in a second display region, the data stored in the file folder and the at least one of the icon or the character string associated with the file folder;

acquiring, by the processor, settings information about the file folder from the cloud storage, in response to user selection of the at least one of the icon or the character string, wherein the settings information is associated with a settings file in the cloud storage;

displaying, by the processor and in a third display region, the settings information;

receiving, by the processor, changes to the settings information from the user, wherein the settings information includes operation authority comprising at least one of browsing authority; editing authority or deletion authority;

storing, by the processor, the settings information in cache on a client side; and updating, by the processor, the cloud storage based on the changes to the settings information.

\* \* \* \* \*